2,984,580
METHODS OF MAKING A LIGNOCELLULOSE PRODUCT AND PRODUCTS RESULTING THEREFROM

William T. Glab, Dubuque, Iowa, assignor, by mesne assignments, to Durel Incorporated, Dubuque, Iowa, a corporation of Iowa No Drawing. Filed Oct. 8, 1958, Ser. No. 765,926

4 Claims. (Cl. 106—163)

This invention relates to methods of making a lignocellulose product and to the products resulting therefrom.

This application is a continuation-in-part of my copending application Serial No. 443,711, filed July 15, 1954, now patent No. 2,864,715, issued December 16, 1958.

It is an object of this invention to provide an improved method of making a moldable composition comprising reacting an essentially dry mixture including comminuted lignocellulose and a reactant including either sulfur dioxide, hydrogen sulfide, or mixtures thereof to split at least a portion of the lignin from the lignocellulose while confining the mixture of lignocellulose and reactant under superatmospheric pressure.

Another object of this invention is to provide such a method wherein the reaction is conducted in an atmosphere of steam at about 300–550° F. for about 4–60 minutes.

A further object of the invention is to provide lignocellulose products prepared by the above methods.

Other objects and advantages of the invention will be apparent from the following description of several embodiments of the invention.

An important advantage of the invention appears to be the controlling of the reaction so that the alpha cellulose is reduced in molecular size sufficiently to prevent swelling of subsequently fabricated products but not to the extent that toughness of fibre is lost. This latter occurs under drastic degradation and starts to become quite serious when approximately 25% of the lignocellulose has beet lost as either gaseous or soluble byproducts. Another advantage appears to be the controlling of the cellulose degradation to plasticize the lignin component so that it can subsequently be made to flow and function as a binder between the comminuted lignocellulose particles.

Another advantage is the provision of a relatively dry system so that high capacity for the processing of, for example, wood waste is attained. This is not possible in a wet process such as ordinarily found in a pulping process in which the reactor is charged with approximately 90% water which takes up space as well as requires the addition of large amounts of energy to bring the reaction medium to the proper temperature.

Another advantage is the contacting of lignocellulose or dry mixes of lignocellulose and other ingredients under superatmospheric pressure with a vapor or combination of vapors functioning both as a heat transfer medium and as a reactant.

In the method of this invention an essentially dry mixture including comminuted lignocellulose and a reactant as specified above capable of breaking down at least a portion of the lignocellulose to provide lignin or modified lignin is reacted as by heating while confining the lignocellulose and the reactant under superatmospheric pressure as in an autoclave. During the reaction the lignocellulose bond is apparently broken and the lignin is released to operate as a binder.

It appears that the hemi-celluloses are the primary constituents of the lignocellulose which are attacked by hydrolysis, but that under the high pressure and temperature of this invention a portion of the hydrolysates are further converted to higher molecular weight materials which can function as plasticizers for the autoclave product when it is molded. At the same time a controlled degradation of the alpha cellulose is carried out to the extent that the desired degree of moisture stability is obtained in the molded or extruded droducts without an unnecessary loss of toughness. These actions are believed to occur although they have not been absolutely proven.

The methods of this invention may be carried out batchwise in an autoclave or a sealed press or continuously in a continuous contactor.

The lignocellulose which appears dry to the touch actually contains up to about 30% water before the reaction begins.

The lignocellulose which may be used in this invention includes wood as well as other lignocellulosic vegetable materials. The lignocellulose is finely divided so that the particles are preferably not more than 20 mesh in size as measured by a standard screen although smaller sizes are preferred.

During the reaction which takes place in a confined atmosphere under superatmospheric pressure various reaction products are produced although the exact nature of the reactions is not understood. It appears that the reaction products are either inert so that the product itself is inert, have a binding action such as is true of the lignin produced, are gaseous by-products, or are polymerized. By hydrolyzing and partially removing or polymerizing the hemi-celluloses to lignin type materials, the ratio of lignin and other binders to the alpha-cellulose is increased so that the general nature of the lignocellulose mixture is drastically changed.

The high pressure method of this invention has a number of advantages that are not possible with reactions taking place at ordinary pressures and in an unconfined state. In the preferred process, steam is introduced into the autoclave both for heating purposes and to supply moisture for the reaction. In the high pressure method of this invention heat transfer is much more rapid so that in general a shorter reaction time is required. Furthermore, energy losses during the reaction are greatly reduced. In the ordinary reacting mixture these energy losses result from the release of volatile materials such as water vapor, gaseous reaction byproducts and the like. As the reaction here takes place in a confined atmosphere, no such losses occur to any material degree. Furthermore, the energy supplied by the steam or vapor is utilized to heat only the lignocellulose with its approximately normal moisture content in contrast to pulping type reactions where large quantities of water are present, requiring far greater expenditures of energy.

Another important advantage of this process is the close control that is obtained over the reaction. Thus the temperature of the reacting mass, and hence the rate of reaction, can be easily raised or lowered by controlling the rate of flow, pressure and the temperature of the heat transfer medium which may be steam, oil vapor, or other high temperature fluids. Reactions may easily be stopped by flashing the heat transfer medium from the autoclave since the large energy loss on expansion cools the reacting mass below the incipient reaction point. During the practice of the process the reacting mixture may be confined in a jacketed vesel with the heating medium introduced to the chambers in the quantity and temperature desired.

A very important advantage of the invention is that volatile reactants may be used as the reacting mass is in a confined space. Volatile reactants are impossible, of course, when the reacting mass is in the open. As a result of the rapid heat transfer achieved by this invention and the penetration of volatile reactants the reaction not only proceeds to completion in a much shorter time but the final product tends to be more uniform than where the reactants are heated such as in an ordinary process that depends upon surface temperature differentials.

Tests have shown that the confining of the reacting mass in the confined autoclave not only causes retention of the by-products of reaction within the mass even when the by-products are gaseous but also causes polymerization of all or a portion of these by-products, even some that are gaseous. In so-called wet processes large quantities of the by-products of reaction go into solution and are lost.

Another advantage of the invention is that the volatile by-products are easily collected and removed at low cost for later use where desired or to prevent the creation of a nuisance.

Since the reactants are volatile no mechanical mixing of the ingredients is required. This results in a considerable saving in time, labor and other factors. Thus, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing a vapor process is that the volatile content of the reaction product which is primarily moisture can be controlled. By using superheated steam with a sufficient degree of superheat, products on the order of 1% or lower volatile content can be obtained. Under normal conditions, 10 to 15 degrees of superheat at 300 pounds per square inch steam pressure will produce a product of 3–5% volatile content. Thus the expensive drying step connected with wet processes can be avoided.

Because of rapid penetration of reactants under high pressure, larger sized particles can be charged to the autoclave than would ordinarily be used, and a savings in size reduction cost made as a result of lower power requirements to reduce the treated material in comparison with raw lignocellulose.

In addition, where flat stock or preformed material is being made as in a sealed press, the products can be made much thicker and more uniform than in an ordinary press which depends upon high platen temperatures for heat transfer, and in many cases requires almost prohibitive cycle times.

Where steam is introduced it is preferably supplied to the autoclave or other confined reactor at a temperature of 300–550° F. and the reaction is permitted to proceed for from 4–60 minutes. In general, the longer periods of time are used with the lower temperatures while shorter periods are required with higher temperatures.

The steam may be saturated or superheated and may be at a pressure of between 200–1,000 pounds per square inch gauge. In the preferred process, the temperature of the steam is between 425–500° F. and the steam is superheated.

The products of the reactions of this invention may be finished shaped materials or moldable compositions that may be used to make molded products. Where the product is molded after the reaction, this product is preferably removed from the reaction vessel and then ground to a fine powder that is preferably not over 50 mesh in size. The finely divided moldable material is heated to a temperature just sufficient to cause the material to flow and fill the mold under the pressure used. This temperature is kept sufficiently low, however, that losses are minor and breakdown due to decomposition is kept to a minimum. The preferred temperature is between 250–400° F.

The molding pressure may be any pressure sufficient to cause the material to fill completely the mold and will vary depending upon the shape of the mold, the nature of the moldable material and other factors. In the preferred process to produce high density materials this pressure is between 2,000–10,000 pounds per square inch. The molding time is only sufficient to cause the moldable material to fill the mold and set, and again will vary depending upon the type of mold being used, the temperature, the nature of the moldable material and similar factors. In general, the molding time will vary between 0.2–15 minutes.

The flow of the moldable material of this invention is improved and a shorter time is required if a plasticizer is added. Plasticizers in general which have been found to be effective with the moldable materials include water; aromatic compounds containing a hydroxyl group such as aniline, glycerol, and furfuryl; nitrogen compounds such as formamide, urea, pyridine, and triethanolamine; and furfural.

The preferred plasticizers are water, furfural, aniline and phenol and the quantity utilized may vary depending on the flow desired. The preferred quantity is between about 2–20%.

In particular, the choice of plasticizer will depend upon the end use or method of fabrication of the material. The reaction products themselves are of a slow thermosetting nature. Thus, if a plasticizer such as water which is incapable of thermoset is used, the material is essentially of a thermoplastic nature. This is also true of the preferred plasticizers as a group; however, when desired, thermoset compositions can be made by using furfural, aniline or phenol in conjunction with a catalyst and, if desired, other materials capable of copolymerization.

Materials which will function as catalysts include the oxides, hydroxides and carbonates of the alkali and alkaline earth metals. The preferred catalysts are the oxides of zinc and magnesium.

Among the materials which may be used with the thermosetting plasticizers as copolymers are hexamethylene tetramine, dimethylolurea, paraformaldehyde and urea.

Depending upon the set time required, about 0.5–5.0% of the catalyst and about 0.5–10% of the copolymer are used.

If desired, thermoset products can be obtained without the use of catalysts or copolymers merely by heat treating the fabricated products after they have been molded or extruded.

If desired, products of density ranging from 0.2–1.3 specific gravity may be produced in the high pressure reacting vessel itself without requiring a subsequent molding operation as described above with high pressure molding. Here the finely divided lignocellulose and additional solid or liquid reactants if used are thoroughly mixed together and the mixture cold pressed into the desired shape or compacted in a sealed press. The compressed mixture is then heated in the press or other high pressure vessel in the presence of sulfur dioxide or hydrogen sulfide for the required time at the required temperature and pressure. The material when removed from the reaction vessel will then be found to be quite hard and strong.

Where the reactants are gaseous such as the mixture of formaldehyde and sulfur dioxide, they may easily be introduced into the reacting vessel under superatmospheric pressure. If desired, of course, the formaldehyde may be mixed in with the lignocellulose as a liquid and the sulfur dioxide introduced as a gas under pressure.

If steam is used, it is preferably supplied at 100–1000 pounds per square inch pressure and at a temperature of 400–550° F. In the event that a sealed press is used, the normal moisture content of the wood as well as the reaction by-products may be used to build up to a predetermined pressure which can be maintained constant by venting the excess vapors produced. This pressure is preferably between 100–600 pounds per square inch. Such a procedure eliminates the blow-ups encountered in treating wood in an ordinary hot press at high temperatures, as well as drastically reducing press time, and polymerizes a percentage of the gaseous and low molecular weight by-products to resinous-like materials which function as binders for lignocellulose particles. If desired, a two step process may be used in which the first step includes the pressure treatment and the second step includes venting the vapors to atmospheric pressure followed by a 2–10 minute heat treatment period before removing the material from the press or the autoclave.

The following table sets forth experiments with moldable compositions prepared in an autoclave and molded products prepared from these compositions.

| Example No. | Composition | Autoclave | | Molding | | | Remarks—Nature of Product |
|---|---|---|---|---|---|---|---|
| | | °F. | Time, Mins. | Mins. | °F. | p.s.i. Pressure | |
| 1 | L–C+25 p.s.i. H$_2$S | 425 | 10 | 4 | 350 | 5,550 | Good. |
| 2 | L–C+25 p.s.i. SO$_2$ | 425 | 10 | 10 | 300 | 5,550 | Very Good. |
| 3 | L–C+25 p.s.i. SO$_2$ | 425 | 10 | 5 | 350 | 5,550 | Good. |
| 4 | L–C+25 p.s.i. SO$_2$ | 425 | 10 | 3.5 | 350 | 5,550 | Do. |

In the above table, L-C indicates lignocellulose while p.s.i. is pounds per square inch of the specified reactant. In each of the examples the reaction took place in the presence of unsaturated steam at about 300 pounds per square inch gauge.

Where lignocellulose is reacted with hydrogen sulfide or sulfur dioxide as in Examples 1–4, the finely divided lignocellulose, containing only its normal moisture content of approximately 6%, is placed in a heated autoclave, and the vessel is evacuated to approximately 15 inches of mercury. Hydrogen sulfide or sulfur dioxide is then admitted to the desired pressure, and then steam is added until the pressure is 300 pounds per square inch and the temperature is approximately 425° F. The autoclave is held under these conditions for 10 minutes and then the steam is rapidly flashed off. During the course of the run, the pressure is maintained at 300 p.s.i. by venting off the excess pressure caused by volatile reaction by-products. The granular reaction product, which had been cooled below the incipient reaction point by the rapid steam flash-off, is removed from the autoclave and all particles which had consolidated are thoroughly broken up. The moisture or volatile content of this material is then approximately 10%.

When hydrogen sulfide is reacted with lignocellulose, the weight lost during the course of reaction is less than with sulfur dioxide. The following reactions illustrate the weight lost when these two reactants are used under similar autoclave conditions.

| Examples | Reactant | Autoclave | | | |
|---|---|---|---|---|---|
| | | Time, Min. | Temp., °F. | Press., p.s.i. | Percent Weight Lost |
| 5 | 25 p.s.i. hydrogen Sulfide. | 10 | 425 | 300 | 7.8 |
| 6 | 25 p.s.i. Sulfur Dioxide. | 10 | 424 | 311 | 12.1 |

In addition to reaction with lignocellulose by itself, sulfur dioxide has been used in conjunction with other materials. Where these additives are either solid or liquid, they are preferably thoroughly blended with the lignocellulose before the lignocellulose is placed in the autoclave. Where volatile reactants are used, they are added in the autoclave. The following table lists a number of typical reactions:

| Example | Sulfur Dioxide, p.s.i. | Additive | Autoclave | | |
|---|---|---|---|---|---|
| | | | Time, Min. | Temp., °F. | Press., p.s.i. |
| 7 | 5 | None | 20 | 440 | 300 |
| 8 | 25 | do | 10 | 419 | 200 |
| 9 | 50 | do | 10 | 424 | 112 |
| 10 | 50 | do | 15 | 437 | 141 |
| 11 | 5 | 5% Ammonium Hydroxide. | 20 | 440 | 300 |
| 12 | 5 | 10% Phenol Residue. | 20 | 440 | 300 |
| 13 | 5 | 5% Cresol | 20 | 440 | 300 |
| 14 | 5 | 10% Vinsol | 20 | 440 | 300 |
| 15 | 5 | 6% Sulfur | 20 | 440 | 300 |
| 16 | 25 | 10% Sulfur | 10 | 437 | 194 |
| 17 | 5 | 5% Urea | 25 | 440 | 300 |
| 18 | 5 | 5% Acetone | 20 | 440 | 300 |
| 19 | 5 | 5% Tar Bases 100A | 20 | 440 | 300 |
| 20 | 25 | 25% Ethyl Alcohol | 10 | 428 | 139 |
| 21 | 25 | 25 p.s.i. Acetylene | 10 | 427 | 139 |
| 22 | 5 | 5% Formaldehyde | 20 | 440 | 300 |
| 23 | 25 | 8% Formaldehyde | 10 | 419 | 328 |
| 24 | 10 | 20% Formaldehyde | 20 | 426 | 300 |
| 25 | 10 | 20% Formaldehyde +10% Sulfur. | 20 | 427 | 300 |

All of the above percentages are based on the weight of the lignocellulose. Where solids are added, they are preferably very finely divided so that they can be uniformly dispersed throughout the lignocellulose. The p.s.i. (pounds per square inch) are gauge pressure.

Where hydrogen sulfide and sulfur dioxide are reacted with lignocellulose, they are preferably supplied to the autoclave at a gauge pressure of between 5–100 p.s.i. When other materials are reacted in conjunction with them, they are preferably added in the following quantities, based on the weight of the lignocellulose.

Additive:     Percent added
    Ammonium hydroxide _____ 1–10
    Phenol residue _____ 2–25
    Cresol _____ 2–20
    Vinsol _____ 2–25
    Sulfur _____ 1–20
    Urea _____ 1–15
    Acetone _____ 1–20
    Tar bases _____ 1–10
    Ethyl alcohol _____ 1–25
    Acetylene _____ [1] 5–50
    Formaldehyde _____ 2–25

[1] P.s.i.

Vinsol is identified in my copending application, Serial No. 608,196, filed September 6, 1956, now Patent No. 2,872,330, issued February 3, 1959.

In the methods of this invention the high pressure reaction may be used to treat the lignocellulose prior to molding but may also be used to chemically treat the lignocellulose without molding as the treated material itself has other uses such as employment as fillers in various plastic compositions. The method may also be used to produce products of a wide range of densities wherein the high pressure reaction and shaping is carried on at the same time.

Where the reaction takes place in an atmosphere of steam the volatile content of the resulting product may be reduced by using superheated steam. There is, of course, very little condensation with superheated steam.

The following table shows the reduction obtained in the volatile content of the product by operating with superheated steam:

| Run No. | Autoclave | | | Percent Volatile Content |
|---|---|---|---|---|
| | Time, Mins. | Temp., ° F. | Pressure, p.s.i. | |
| A | 10 | 419 | 323 | 14.5 |
| B | 10 | 425 | 300 | 5.89 |
| C | 20 | 438 | 256 | 1.3 |
| D | 30 | 417 | 330 | 58.3 |
| E | 30 | 425 | 300 | 5.78 |

All of the above runs were made with plain lignocellulose, but are typical of the results in general.

It was also found that when the reaction pressure is increased, the reaction time was considerably decreased. Thus, where ground lignocellulose was used with steam at 300 pounds per square inch and about 425–450° F. temperature as a reactant the reaction time was found to be 20 minutes at this 300 pounds per square inch pressure. When the pressure was increased to 400 pounds per square inch, the reaction time was only about 7 minutes. Where the steam pressure was increased to 500 pounds per square inch, the reaction time was reduced to between 4–5 minutes. These steam pressures were all gauge pressures.

The reaction temperatures and times are controlled as desired to produce flow or moldability in the autoclave product and strength and stability in the final product. Thus, where the product is to be used as a molding material, it was discovered that under the above conditions with plain lignocellulose a reaction time of less than 20 minutes resulted in poor flow. But at this same steam pressure and using the same lignocellulose a reaction time of over 30 minutes produced a high quality moldable product. Apparently steam breaks down the lignocellulose so that the lignin acts as a binder while some of the hydrolized products of the reaction operate as plasticizers. In the high pressure confined atmosphere method of this invention, these reaction products are primarily retained. In the prior processes where a hydrolyzing reaction was carried out either in the atmosphere or in a slurry, many of the by-products either passed off as gases or were dissolved and removed in the liquid. Thus by avoiding excess water and process of this invention results in the saving of substantial portions of the hemi-celluloses and makes them available for use as plasticizers. However, if the reaction is carried on too long a time at too high a temperature, the hemicelluloses and other hydrolized products of the reaction tend to polymerize so that the final product exhibits lack of flow and is difficult to mold. The nature of these polymerizates is not completely understood.

Thus one of the advantages of the process of this invention is that it reduces losses of the lignocellulose and, furthermore, permits the use of lower molding pressures and temperatures when the reaction product is used as a molding composition.

Having described my invention as related to the embodiments set out herein, it is my intention that the invention be not limited by any of the details of description unless otherwise specified, but rather be construed broadly within its spirit and scope as set out in the accompanying claims.

I claim:

1. The method of making a lignocellulose product, consisting essentially of: reacting particles of lignocellulose in the presence of steam and a member of the class consisting of sulfur dioxide, hydrogen sulfide and mixtures thereof by heating under confined superatmospheric pressure for between about 4–60 minutes and at between about 300–550° F. to combine chemically at least a portion of said member with the lignocellulose.

2. The method of making a lignocellulose product, consisting essentially of: reacting particles of lignocellulose with sulfur dioxide in the presence of steam by heating under confined superatmospheric pressure for between about 4–60 minutes and at between about 300–550° F. to combine chemically at least a portion of the sulfur dioxide with the lignocellulose.

3. The method of making a lignocellulose product, consisting essentially of: reacting particles of lignocellulose with hydrogen sulfide in the presence of steam by heating under confined superatmospheric pressure for between about 4–60 minutes and at between about 300–550° F. to combine chemically at least a portion of the hydrogen sulfide with the lignocellulose.

4. A lignocellulose product prepared by the method of claim 1.

References Cited in the file of this patent

UNITED STATES PATENTS 2,706,160    Glab    Apr. 2, 1955